United States Patent [19]
Rittler

[11] Patent Number: 5,691,257
[45] Date of Patent: Nov. 25, 1997

[54] LOW DENSITY CELLULATED BODY AND METHOD

[75] Inventor: Hermann L. Rittler, Corning, N.Y.

[73] Assignee: Corning Incorporated, Corning, N.Y.

[21] Appl. No.: 663,432

[22] Filed: Jun. 13, 1996

Related U.S. Application Data

[60] Provisional application No. 60/001,243, Jul. 19, 1995.
[51] Int. Cl.⁶ .......................... C04B 38/02; C04B 38/10
[52] U.S. Cl. .......................... 501/84; 501/10; 501/39; 106/38.3; 106/38.4; 106/38.9
[58] Field of Search .......................... 561/39, 45, 47, 561/48, 10, 84, 85; 106/38.3, 38.4, 38.9

[56] References Cited

U.S. PATENT DOCUMENTS

| | | |
|---|---|---|
| 3,223,537 | 12/1965 | Wiegert et al. . |
| 3,261,696 | 7/1966 | Wiegert et al. . |
| 3,372,110 | 3/1968 | Fuchs . |
| 3,382,082 | 5/1968 | Eubanks et al. . |
| 3,547,670 | 12/1970 | Fuchs et al. . |
| 3,736,176 | 5/1973 | Francel et al. . |
| 3,762,935 | 10/1973 | Leach . |
| 4,666,867 | 5/1987 | Beall et al. ............... 501/39 |
| 4,784,977 | 11/1988 | Aitken ..................... 501/39 |
| 5,281,399 | 1/1994 | Rittler . |
| 5,336,645 | 8/1994 | Rittler . |
| 5,403,519 | 4/1995 | Rittler . |
| 5,488,016 | 1/1996 | Rittler . |

Primary Examiner—Karl Group
Attorney, Agent, or Firm—Milton M. Peterson

[57] ABSTRACT

A cellulated, inorganic body, and a method of producing the body, the body having a very low bulk density and being resistant to aqueous and chemical attack, the cells being gas- or vacuum-filled, predominantly closed, and dispersed in a crystalline matrix.

16 Claims, No Drawings

LOW DENSITY CELLULATED BODY AND METHOD

This application claims the benefit of U.S. Provisional Application No. 60/001,243, filed Jul. 19, 1995 entitled LOW DENSITY CELLULATED BODY AND METHOD, by Hermann L. Rittler.

FIELD OF THE INVENTION

A cellulated, ceramic body and a method of producing such body from a thermally foamable mixture.

BACKGROUND OF THE INVENTION

Numerous techniques have been proposed for producing thermally cellulated bodies from such diverse materials as glasses, ceramics and organic plastics. It is customary to introduce a source of gas, either in a parent batch or in a granular mixture of the prepared material. Such known cellulated products are generally intended to be durable and resistant to attack.

My U.S. Pat. No. 5,403,519 and No. 5,488,016 disclose an amorphous, polymeric material that contains phosphorous, aluminum and carbon atoms. This material may be thermally foamed at relatively low temperatures on the order of 300° C. to produce a crystallized matrix having gas-filled, or vacuum-filled, cells dispersed throughout the matrix. The matrix may be essentially an aluminophosphate crystal phase, or a mixture of alumino and borophosphate crystal phases.

My U.S. Pat. No. 5,281,399 discloses a refractory body assembly. This assembly includes a barrier layer in an intermediate space between a refractory container and a honeycomb-type, refractory body positioned within the container. The barrier layer is a rigid, cellulated layer produced from the foamable material of the -519 patent.

My U.S. Pat. No. 5,336,645 discloses a soluble, thermally cellulated, ceramic mold member having gas-evolved cells dispersed in a soluble, crystalline matrix. It further discloses a mixture capable of being thermally foamed to form such cellulated member. The mixture consists essentially of at least one phosphorous-containing compound, at least one boron-containing compound, at least one solubilizing agent selected from the group consisting of alkali metal compounds, divalent metal compounds and acrylic resins, at least one organic binder and a gas-evolving agent.

The soluble, cellulated material described in the -645 patent has generated considerable interest because of its ease of removal. However, there are applications that require a very light weight, cellulated material that is relatively insoluble. One such application is a mold that would not be removed. Rather, it would remain in place and be assembled with the molded member.

The present invention is directed to such applications. It provides a cellulated body that has an exceptionally low density, is relatively insoluble, and resists physical or chemical destruction. The invention further provides a unique method of thermally cellulating such a body at relatively low temperatures.

SUMMARY OF THE INVENTION

The article of the invention is a cellulated, inorganic body having a very low bulk density and being resistant to aqueous and chemical attack, the cells being gas- or vacuum-filled, predominantly closed, and dispersed in a crystalline matrix.

The invention further resides in a method of producing the article which comprises mixing a gas-evolving agent with materials that are reactive to form the crystalline matrix and heating the mixture to a low temperature in a rapid thermal cycle.

PRIOR ART

In addition to the art previously described, attention is directed to United States Patents described in the specifications of that art.

DESCRIPTION OF THE INVENTION

The product of the invention is a foamed, inorganic body, that is, a body having cells dispersed within a crystalline matrix. The foamed body is produced by thermal treatment of a foamable mixture, that is, a mixture containing materials reactive to produce the crystalline matrix and a gas-evolving agent to produce the cells as the matrix forms.

The cells may contain a gas, such as $CO_2$, $SO_2$, $N_2$, $H_2O$, $Cl_2$, $NH_3$, or $H_2$, depending on the gas-evolving agent. They may also be essentially under vacuum, as is the case where the gas forming the cells condenses on cooling, for example, steam in closed cells. Normally, the cells in my product are formed by steam, but may be under vacuum since they are predominantly closed cells.

The crystalline matrix comprises a primary crystalline phase of aluminum phosphate ($AlPO_4$), boron phosphate ($BPO_4$), or a mixed aluminoborophosphate. In addition, the matrix may contain a wide variety of reactive additives and/or inert fillers.

A unique feature of my foamed material is the combination in one material of properties of extremely light weight, and the ability to withstand elevated casting and curing temperatures, for example, up to 1500° C. These features make the material particularly useful for production of mold members for casting organic plastics at temperatures up to 500° C. The mold member may be a core around which a molten material is cast. Alternatively, it may be an exterior mold within which the molten material is cast and cooled.

In either form, the cellular mold material is produced by heating a thermally foamable mixture at a low temperature not over about 400° C., preferably about 300° C. The foamable mixture basically comprises a compound containing phosphorous, a boron or an aluminum compound, or a mixture of boron and aluminum compounds, a nitrogen-containing compound, a gas evolving agent and an organic binder.

Any source of phosphorous may be employed. Commercial phosphoric acid, $H_3PO_4$ (85% by weight) is a convenient source. However, various phosphates, such as aqueous solutions of ammonium mono-, or di-, basic phosphate, or a metal phosphate, such as calcium phosphate, may be employed, providing the additional ions are desired, or may be tolerated. The ammonium phosphates may be desirable as a solvent where boric oxide is to be incorporated in the material.

The aluminum and boron sources may be the oxides. However, I prefer to use other boron compounds, such as a borate.

Aluminum phosphate crystal phases tend to be relatively insoluble. Where the foamable material includes an aluminum compound, the oxide may be employed. However, I prefer a hydrated or hydroxide form.

Any of the commonly used gas-evolving agents, also referred to as blowing agents, may be employed. However, I prefer to employ steam as a cellulating agent. Accordingly, I employ hydrated materials, for example, hydrated alkali borates. These react with a relatively weak acid, for example, boric or phosphoric acid, to produce a salt and steam.

Ceramic foam compositions are typically made using numerous types of fillers and binders to achieve the desired rheological properties for forming requirements.

A mineral type filler, such as cordierite, may be employed to improve the refractory characteristics. This may be conveniently supplied as a pulverized, cordierite glass-ceramic, that is a glass-ceramic in which the principal crystal phase is cordierite. Where refractoriness is less important, as in lower temperature casting molds, less refractory fillers, such as talc or a clay, may be used to reduce cost.

The organic binder may be any of the commercially available organic compounds and materials known for that purpose. These include one or more members selected from the following organic groups: cellulosics, alcohols, epoxies, phenolics, melamines, acrylamides, acrylates, gums, alginates, silastics and poly butenes. Also utilized as additives are some commercial blowing agents containing ingredients typified by tartaric acid, and various surfactants.

minutes, and preferably is less than 5 minutes. In producing small molds and other bodies, I have found it convenient to employ microwave heating.

The invention is further described with respect to specific embodiments. TABLE I sets forth several compositions expressed in terms of moles. Slurries based on these compositions have been mixed and rapidly heated to produce cellulated bodies having densities as shown in the TABLE. Preferably, densities are less than 0.1 and, more preferably, no more than 0.05 gm/cc.

Test pieces were prepared based on each batch. The dry materials were mixed and placed in a 150 ml beaker. Liquids were then added and the batch mixed by stirring. The mixture was rapidly heated to 400° C. in air, held for two hours, and cooled. The resulting solid foam was removed from the beaker, and a cube about an inch (2.5 cm) on a side was cut from the mass for density measurements.

TABLE I

|                  | 1   | 2    | 3    | 4    | 5    | 6    | 7    | 8    | 9    |
|------------------|-----|------|------|------|------|------|------|------|------|
| H3PO4            | 3.1 | 2    | 1    | 3    | 3    | 3    | 2.5  | 1    | 3    |
| ALOOH            | 1   | 1    | 1    | 1    | 2    | 3    |      |      |      |
| B(OH)3           |     |      |      |      |      |      | 1    | 1    | 1    |
| CH4N20           | 2   | 2    | 2    | 2.5  | 2    | 4    | 2    | 2    | 2    |
| HOH              | 5.6 | 5.6  | 5.6  | 2    | 5.5  | 6    | 6    | 6    | 3    |
| Density (gm/cc)  |     | 0.06 | 0.03 | 0.14 | 0.12 | 0.05 | 0.03 | 0.04 | 0.02 |

|                  | 10   | 11   | 12   | 13   | 14  | 15  | 16  | 17  | 18  |
|------------------|------|------|------|------|-----|-----|-----|-----|-----|
| H3PO4            | 2.5  | 1.5  | 3    | 3.1  |     |     |     |     |     |
| NaBO2            | 1    | 1    | 1    |      |     |     |     |     |     |
| ALOOH            |      |      |      | 1    |     |     |     |     |     |
| CH4N20           | 2    | 2    | 2    | 2    |     |     |     |     |     |
| HOH              | 6    | 6    | 2    | 5.6  |     |     |     |     |     |
| Al°              |      |      |      | 0.2  |     |     |     |     |     |
| SiC              |      |      |      |      | 0.2 |     |     |     |     |
| RICE HULLS       |      |      |      |      |     | 0.2 |     |     |     |
| CYM.350          |      |      |      |      |     |     | 0.2 |     |     |
| THFURAN          |      |      |      |      |     |     |     | 0.2 |     |
| PVA              |      |      |      |      |     |     |     |     | 0.2 |
| Density (gm/cc)  | 0.03 | 0.09 | 0.06 | 0.09 |     |     |     |     |     |

CYM.350 and PVA are polyvinyl alcohol type polymers.
THFURAN is a tetrahydrofuran polymer.

A key feature of the present invention is production of relatively insoluble, closed cell, cellulated ceramic bodies having bulk densities on the order of 0.03 gm/cc. These cellulated materials are non-toxic and non-combustible, and can withstand heating to 1200° C. without deforming or deteriorating.

I have found that production of cellulated ceramic bodies of exceptionally low density requires certain conditions. First, a nitrogen compound, preferably urea, must be present in the slurry to be cellulated. That slurry must contain a phosphorous compound, preferably phosphoric acid. It must further contain at least one of an aluminum or boron compound, preferably aluminum hydroxide or boric acid.

The slurry must be heated at a very rapid rate to a temperature at which water or other volatiles are sublimed or volatilized. One of the keys to a low density is the rapid rate of heating to a cellulating temperature, which may be about 300° C. Thus, the thermal cycle should not exceed ten

I claim:

1. A cellulated inorganic body having a bulk density less than 0.1 gm/cc and being resistant to aqueous and chemical attack, the cells being gas- or vacuum-filled, predominantly closed, and dispersed in a crystalline matrix.

2. A cellulated body in accordance with claim 1 wherein the primary phase in the crystalline matrix is selected from a group consisting of aluminum phosphate, boron phosphate and aluminoborophosphate.

3. A cellulated body in accordance with claim 2 wherein the primary crystal phase is aluminum phosphate.

4. A cellulated body in accordance with claim 1 wherein the body contains an inorganic filler.

5. A cellulated body in accordance with claim 4 wherein the filler is selected from a group consisting of cordierite-containing materials, clays and talcs.

6. A cellulated body in accordance with claim 1 wherein the density is not over about 0.05 gm/cc.

7. A cellulated body in accordance with claim 1 wherein the density is not over about 0.03 gm/cc.

8. A cellulated body in accordance with claim 1 that is a mold for a casting and that remains assembled with the casting.

9. A method of producing the cellulated body of claim 1 which comprises mixing a gas-evolving agent with materials that are reactive to form the crystalline matrix and heating the mixture to a low temperature in a rapid thermal cycle of not over about 10 minutes.

10. A method in accordance with claim 9 which comprises heating the mixture to a temperature not over about 400° C.

11. A method in accordance with claim 10 which comprises heating the mixture to a temperature of about 300° C.

12. A method in accordance with claim 9 which comprises heating the mixture in a thermal cycle not over five minutes.

13. A method in accordance with claim 9 which comprises including a source of water in the mixture as a gas-evolving agent.

14. A method in accordance with claim 13 which comprises including a hydrated material in the mixture as a source of water.

15. A method in accordance with claim 9 which comprises forming a slurry that includes a phosphorous compound, a nitrogen compound, an aluminum or boron compound or both, and a source of cellulating gas.

16. A method in accordance with claim 15 which comprises forming a slurry including an aluminum compound.

* * * * *